(12) United States Patent
Tan Bergström et al.

(10) Patent No.: US 10,064,160 B2
(45) Date of Patent: Aug. 28, 2018

(54) TECHNIQUES FOR PROVIDING WLAN IDENTIFIER LISTS TO TERMINAL DEVICES

(71) Applicant: Telefonaktiebolaget LM Ericsson (publ), Stockholm (SE)

(72) Inventors: Mattias Tan Bergström, Stockholm (SE); Magnus Stattin, Upplands Väsby (SE); Kai-Erik Sunell, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 15/126,662

(22) PCT Filed: Mar. 4, 2015

(86) PCT No.: PCT/SE2015/050241
§ 371 (c)(1),
(2) Date: Sep. 16, 2016

(87) PCT Pub. No.: WO2015/142245
PCT Pub. Date: Sep. 24, 2015

(65) Prior Publication Data
US 2017/0086167 A1    Mar. 23, 2017

Related U.S. Application Data

(60) Provisional application No. 61/968,637, filed on Mar. 21, 2014.

(51) Int. Cl.
*H04W 72/00* (2009.01)
*H04W 76/11* (2018.01)
(Continued)

(52) U.S. Cl.
CPC .......... *H04W 72/005* (2013.01); *H04W 4/06* (2013.01); *H04W 48/12* (2013.01); *H04W 76/11* (2018.02); *H04W 48/18* (2013.01); *H04W 84/12* (2013.01)

(58) Field of Classification Search
CPC . H04W 72/005; H04W 76/021; H04W 48/12; H04W 4/06; H04W 84/12; H04W 48/18
See application file for complete search history.

(56) References Cited

U.S. PATENT DOCUMENTS

2013/0153298 A1  6/2013 Pietraski et al.
2016/0157163 A1* 6/2016 Lee ..................... H04W 48/08
                                          370/338

FOREIGN PATENT DOCUMENTS

EP        2 068 585        6/2009

OTHER PUBLICATIONS

Supplementary European Search Report for Application No. EP 15 76 6000—dated Dec. 1, 2016.
(Continued)

*Primary Examiner* — Thai Nguyen
(74) *Attorney, Agent, or Firm* — Sage Patent Group

(57) ABSTRACT

Techniques for providing WLAN identifier lists to terminal devices There is provided a method of operating a network node in a cellular communications network, the method comprising obtaining a list of wireless local area network, WLAN, identifiers that are to be considered by terminal devices in the cellular communications network when the terminal devices perform a access network selection and/or traffic steering or routing procedure with respect to the cellular communications network and one or more WLANs; and dividing the list into a plurality of segments that are to be separately broadcast to the terminal devices in a broadcast channel.

13 Claims, 8 Drawing Sheets

(51) Int. Cl.
  *H04W 4/06* (2009.01)
  *H04W 48/12* (2009.01)
  *H04W 48/18* (2009.01)
  *H04W 84/12* (2009.01)

(56) References Cited

OTHER PUBLICATIONS

Title: Handling of WLAN Identifiers; Source: Ericsson; 3GPP TSG-RAN WG2 #85; Prague, Czech Republic (Tdoc R2-140454)—Feb. 10-14, 2014.
3rd Generation Partnership Project; Technical Specification Group Radio Access Network; Evolved Universal Terrestrial Radio Access (E-UTRA); Radio Resource Control (RRC); Protocol Specification (Release 11); 3GPP TS 36.331 v11.6.0 (p. 26)—Dec. 2013.
3GPP TSG-RAN2 Meeting #86; Seoul, South Korea; Change Request; Title: Introduction of WiFi/3GPP Radio interworking support in RRC (R2-142368)—May 19-23, 2014.
3GPP TSG-RAN WG2 Meeting #86; Seoul, Korea; Change Request; Title: Proposed RRC messages for 3GPP/WLAN radio interworking (R2-142718)—May 19-23, 2014.
3GPP TSG RAN WG2 #83bis; Ljubljana, Slovenia; Source: Ericsson; Title: The need for additional broadcast capacity (R2-133415)—Oct. 7-11, 2013.
3GPP TSG-RAN2 Meeting #85; Prague, Czech Republic; Source: Intel Corporation; Title: Proposed way forward on WLAN/3GPP radio interworking (R2-140842)—Feb. 10-14, 2014.
3GPP TSG-RAN WG2 #86; Seoul, South Korea; Source: Ericsson; Title: WLAN identifier provisioning (Tdoc R2-142371)—May 19-23, 2014.
PCT Written Opinion of the International Searching Authority for International application No. PCT/SE2015/050241—dated Sep. 4, 2015.
International Search Report for International application No. PCT/SE2015/050241—dated Sep. 4, 2015.

* cited by examiner

TECHNIQUES FOR PROVIDING WLAN IDENTIFIER LISTS TO TERMINAL DEVICES

PRIORITY

This nonprovisional application is a U.S. National Stage Filing under 35 U.S.C. § 371 of International Patent Application Serial No. PCT/SE2015/050241 filed Mar. 4, 2015, and entitled "Techniques For Providing WLAN Identifier Lists To Terminal Devices" which claims priority to U.S. Provisional Patent Application No. 61/968,637 filed Mar. 21, 2014, both of which are hereby incorporated by reference in their entirety.

TECHNICAL FIELD

The present disclosure is generally related to cellular communications systems, and is more particularly related to techniques for providing information, such as lists of wireless local area network (WLAN) identifiers, to terminal devices that are capable of operating according to multiple radio access technologies (RATs), such as a wide area (cellular) wireless communication technology and WLAN technology.

BACKGROUND

The wireless local-area network (WLAN) technology known as "Wi-Fi" has been standardized by IEEE in the 802.11 series of specifications (i.e., as "*IEEE Standard for Information technology—Telecommunications and information exchange between systems. Local and metropolitan area networks—Specific requirements. Part 11: Wireless LAN Medium Access Control (MAC) and Physical Layer (PHY) Specifications*"). As currently specified, Wi-Fi systems are primarily operated in the 2.4 GHz or 5 GHz bands.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks.

Many of today's portable wireless devices (referred to hereinafter as "user equipments", "UEs", or more generally "terminal devices") support Wi-Fi in addition to one or several 3GPP cellular technologies. In many cases, however, these terminal devices essentially behave as two separate devices, from a radio access perspective. The 3GPP-specified radio access network (RAN) and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

It is currently discussed in 3GPP how 3GPP Radio Access Technologies (RATs) can be integrated and/or interwork with WLAN. The focus of this work is how to perform access selection and/or traffic steering or routing between 3GPP and WLAN. One possible way in which access network selection and/or traffic steering or routing can be performed between two RATs is presented below.

In this technique the 3GPP network sends a set of conditions and/or thresholds to the UE which are used by the UE in one or more pre-defined rules dictating when the UE should steer traffic from one RAT to the other.

For example, a pre-defined rule could be as shown in Table 1, where values for threshold1, threshold2, threshold3 and threshold4 are provided to the UE by the 3GPP network i.e. a network node of the 3GPP RAT, such as an eNodeB, NodeB or radio network controller (RNC).

TABLE 1

```
if (3GPP signal < threshold1) && (WLAN signal > threshold2) {
    steerTrafficToWLAN( );
} else if (3GPP signal > threshold3) || (WLAN signal < threshold4) {
    steerTrafficTo3gpp( );
}
```

Thus, according to this rule, if the UE-measured 3GPP signal is below threshold1 and the UE-measured WLAN signal is above threshold2, then the UE steers traffic to WLAN. Otherwise, if the 3GPP signal is above threshold3 or the WLAN signal is below threshold4, the UE steers traffic to the 3GPP network.

The term '3GPP signal' herein could mean the signal transmitted by a radio network node belonging to a 3GPP RAT, e.g. a node in a LTE, HSPA, GSM etc. network, and/or it could be the quality of such a signal. The term WLAN signal' herein could mean the signal transmitted by a radio network node belonging to WLAN, e.g. an access point (AP) etc., and/or it could be the quality of such a signal. Examples of measurements of 3GPP signals include reference signal received power (RSRP) and reference signal received quality (RSRQ) in LTE or common pilot channel (CPICH) received signal code power (RSCP) and CPICH Ec/No in HSPA. Examples of measurements of WLAN signals are Received Signal Strength Indicator (RSSI), Received Channel Power Indicator (RCPI), Received Signal to Noise Indicator (RSNI), etc.

With the above mobility mechanism, it is likely that the 3GPP network operator would like to restrict the WLANs that are considered by the terminal device in evaluating the rule. For example, the operator of the 3GPP network may wish to restrict the terminal device to only those WLANs that belong to the 3GPP network operator. Thus, there is a need for the 3GPP network to indicate to the terminal device which WLANs should be considered by the terminal device during the access network selection and/or traffic steering or routing procedure.

Different mechanisms have been proposed for this which are based on either the dedicated signalling of the WLAN identifiers to the terminal devices or on the broadcasting of WLAN identifiers to terminal devices.

Transmission of WLAN identifiers to a terminal device using dedicated signalling has the benefit of avoiding overhead in the broadcast channel, but dedicated signalling would require the network to signal the WLAN identifiers separately to each terminal device. This could introduce some network and terminal complexity, and depending on the scenario, dedicated signalling may result in a lot of signalling load in a dedicated signalling channel.

The broadcast of the WLAN identifiers in a broadcast channel also has some limitations, e.g. with respect to broadcast channel load. It may not be feasible, or even possible, to signal multiple WLAN identifiers during a single transmission in a broadcast channel.

Thus, there is a need for an improved technique for providing a list of WLAN identifiers to a terminal device for use in an access network selection and/or traffic steering or routing procedure.

SUMMARY

The techniques described herein allow for the cellular network to signal WLAN identifiers to the terminal device in a broadcast channel while keeping the load of the broadcast channel at a reasonable level. The techniques described herein take advantage of the fact that providing WLAN identifiers to a terminal device is often not a time critical process, i.e. it may be acceptable in some scenarios that WLAN identifier provisioning takes of the order of 100 milliseconds, or even longer. It will be appreciated that, although the following described is directed to the broadcast of a list of WLAN identifiers, similar techniques can also or alternatively be used to transmit other types of information to terminal devices in a broadcast channel, where that information is typically too large to be included in a single transmission of the broadcast information.

Thus, in the techniques described herein the network divides the list of WLAN identifiers into a number of segments, and broadcasts these segments separately to the terminal devices. The terminal devices receive said segments over a period of time and combine them to build up the complete list of WLAN identifiers.

Further techniques described herein provide ways for the terminal device to know when all segments of the WLAN list have been received so that the terminal device can stop monitoring the broadcast channel (or at least the part of the broadcast channel used for WLAN identifier provisioning) to enable the terminal device to save power.

Yet further techniques provide a mechanism to ensure that the terminal device has an up-to-date list of WLAN identifiers, which is important, for example in case the terminal device moves between cells or the list of WLAN identifiers which should be considered in a particular cell changes.

Some techniques described herein allow the terminal device to store a list of WLAN identifiers for a cell and to refrain from reading the broadcasted list of WLAN identifiers when the terminal device enters that cell, which would allow for further power savings in the terminal device.

Example embodiments of some of the techniques disclosed herein are detailed at the end of the present document.

However, it should be understood that the list of example embodiments is not intended to be an exhaustive representation of the embodiments described herein.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
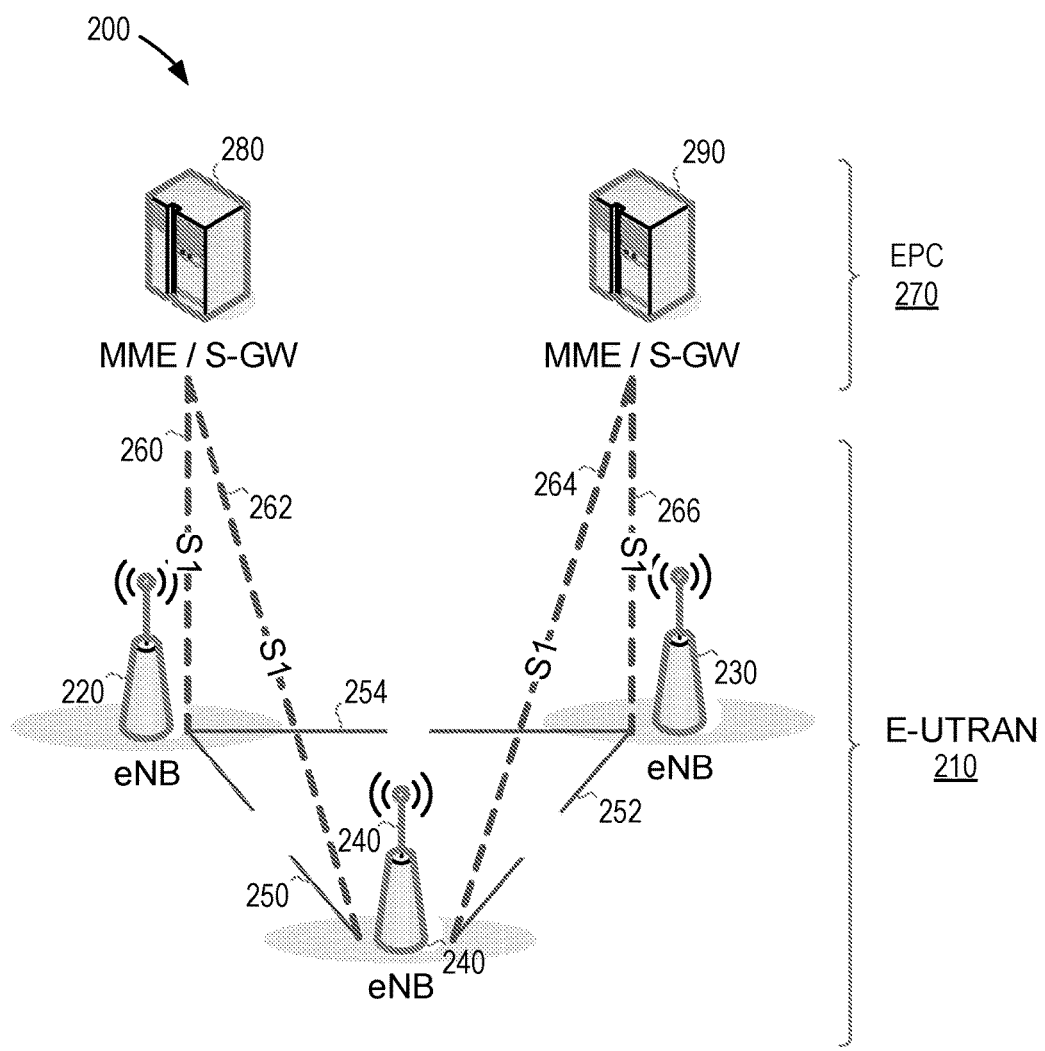
FIG. 1 is a diagram illustrating the overall architecture of an LTE network.

In the discussion that follows, specific details of particular embodiments of the present teaching are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), digital signal processors (DSPs), reduced instruction set processors, field programmable gate arrays (FPGAs), state machines capable of performing such functions, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present teachings may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "terminal devices", although other generally equivalent terms such as "mobile devices", "communication devices", "mobile stations" and particularly "UEs"—which is a 3GPP term for end user wireless devices—may also be used. It should be appreciated, however, that the techniques and apparatus described herein are not limited to 3GPP UEs (i.e. UEs or terminal devices that are capable of operating according to one or more 3GPP standardised technologies), but are more generally applicable to end user wireless devices (e.g., portable cellular telephones, smartphones, wireless-enabled tablet computers, etc.) that are capable of operating according to a wireless local area network (WLAN) technology, such as one or more of the IEEE 802.11 standards, and useable in cellular systems in which the device communicates with a radio access network (RAN) using one or multiple carriers or cells (e.g. known as a carrier aggregation (CA) mode in LTE). It should also be noted that the current disclosure relates to end user terminal devices that support multiple wide-area cellular technologies, such as any of the wide-area radio access standards maintained by 3GPP. End user devices are referred to in Wi-Fi document as "stations," or "STA"—it should be appreciated that the term "UE" or "terminal device" as used herein should be understood to refer to a STA, and vice-versa, unless the context clearly indicates otherwise.

As used herein, a "base station" comprises in a general sense any network node transmitting radio signals in the downlink (DL) to a terminal device and/or receiving radio signals in the uplink (UL) from the terminal device. Some example base stations are eNodeB, eNB, NodeB, macro-/micro-/pico-/femto-cell radio base station, home eNodeB (also known as a femtocell base station), relay, repeater, sensor, transmitting-only radio nodes or receiving-only radio nodes. A base station may operate or at least perform measurements in one or more frequencies, carrier frequencies or frequency bands and may itself be capable of carrier aggregation. It may also be a single-radio access technology (RAT), multi-RAT, or multi-standard node, e.g., using the same or different base band modules for different RATs.

The signalling between the terminal devices and the network nodes (e.g. a base station or another node in the RAN or core network) described below is either via direct links or logical links (e.g. via higher layer protocols and/or via one or more other network nodes). For example, signalling from a coordinating node may pass another network node, e.g., a radio node.

Overall E-UTRAN architecture—An exemplary Evolved UMTS (Universal Mobile Telecommunications System) Terrestrial Radio Access Network (E-UTRAN) architecture is shown in FIG. 1. The E-UTRAN architecture 210 consists of base stations 220, 230, 240 called enhanced NodeBs (eNBs or eNodeBs), which provide the E-UTRA user plane and control plane protocol terminations towards the User Equipment (UE). The eNBs 220, 230, 240 are interconnected with each other by means of the X2 interface 250, 252, 254. The eNBs 220, 230, 240 are also connected by means of the S1 interface 260, 262, 264, 266 to the EPC 270 (Evolved Packet Core), more specifically to the MME 280, 290 (Mobility Management Entity), by means of the S1-MME interface, and to the Serving Gateway 280, 290 (S-GW) by means of the S1-U interface. The S1 interface supports many-to-many relations between MMEs/S-GWs and eNBs.

The eNB 220, 230, 240 hosts functionalities such as Radio Resource Management (RRM), radio bearer control, admission control, header compression of user plane data towards the UE, and routing of user plane data towards the serving gateway. The MME 280, 290 is the control node that processes the signalling between the UE and the core network 270. The main functions of the MME 280, 290 are related to connection management and bearer management, which are handled via Non Access Stratum (NAS) protocols. The S-GW 280, 290 is the anchor point for UE mobility, and also includes other functionalities such as temporary downlink data buffering while the UE is being paged, packet routing and forwarding the right eNB 220, 230, 240, gathering of information for charging and lawful interception. The PDN (Packet Data Network) Gateway (P-GW—not shown in FIG. 1) is the node responsible for UE IP address allocation, as well as Quality of Service (QoS) enforcement. The 3GPP document "Evolved Universal Terrestrial Radio Access (E-UTRA) and Evolved Universal Terrestrial Radio Access Network (E-UTRAN); Overall Description; Stage 2," 3GPP TS 36.300, v. 11.3.0 (September 2012), available at www.3gpp.org, and the references therein provide details of the functionalities of the different nodes shown in FIG. 1.

Figure 2:
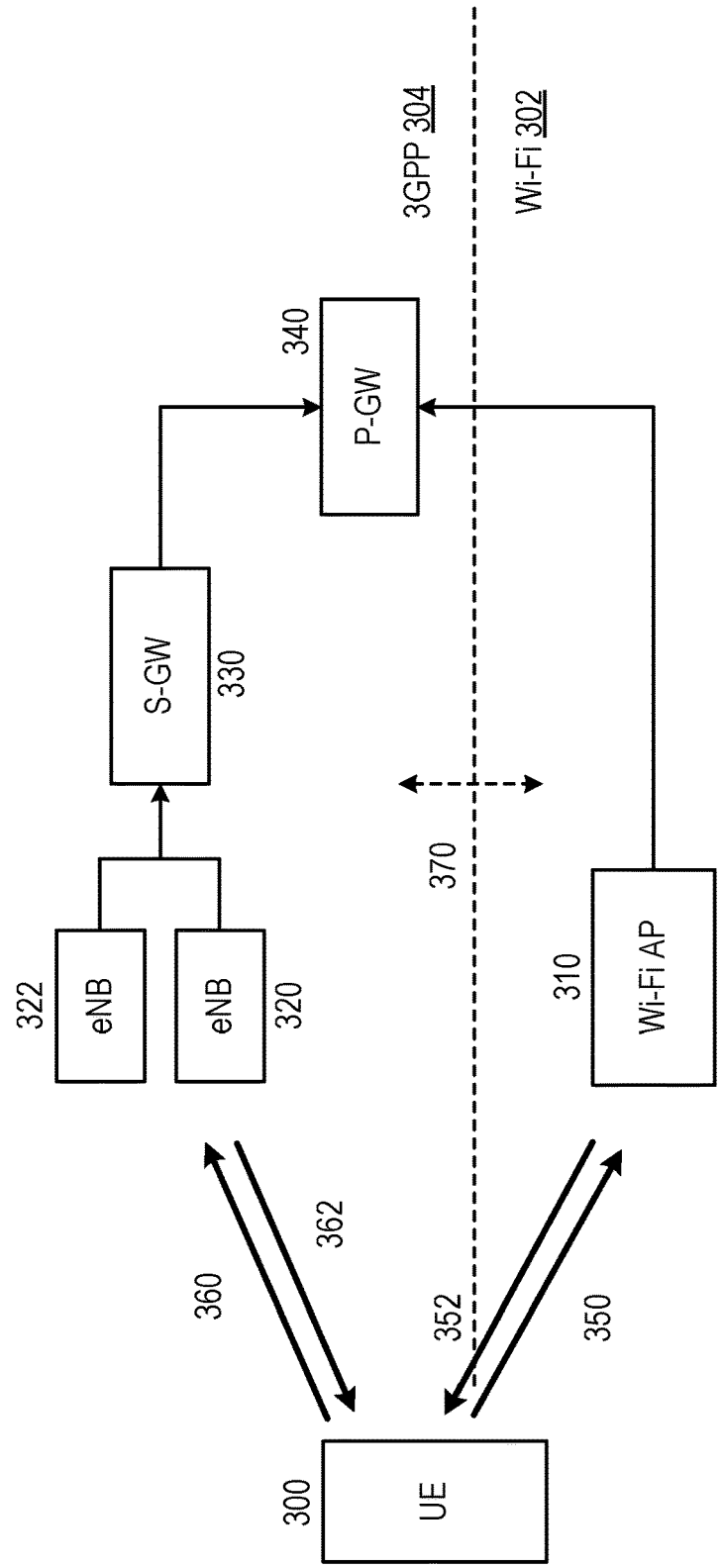
FIG. 2 illustrates part of an LTE network and a W-Fi network.

FIG. 2 illustrates a network where the LTE radio access parts (eNBs) 320, 322 and a Wi-Fi wireless access point 310 are both connected to the same P-GW 340. In the case of the LTE radio access parts, the eNBs 320, 322 are connected to the P-GW 340 via an S-GW 330. A UE 300 is shown that is capable of being served both from the Wi-Fi Access Point 310 and the LTE eNBs 320, 322. Arrows 350 and 352 illustrate the uplink (UL) and downlink (DL) transmissions between the UE 300 and the Wi-Fi AP 310 respectively and arrows 360 and 362 illustrate the uplink (UL) and downlink (DL) transmissions between the UE 300 and the eNBs respectively. FIG. 2 illustrates one possible way of connecting a Wi-Fi access network 302 to the same core network as the 3GPP-specified access network 304. The gateways (Trusted Wireless Access Gateway, TWAG, evolved Packet Data Gateway, ePDG, etc) between Wi-Fi AP and P-GW are omitted for simplicity. It should be noted that the presently disclosed techniques are not restricted to scenarios where the Wi-Fi access network 302 is connected in this way; the techniques can be applied to scenarios where the networks are more or completely separate.

Figure 3:
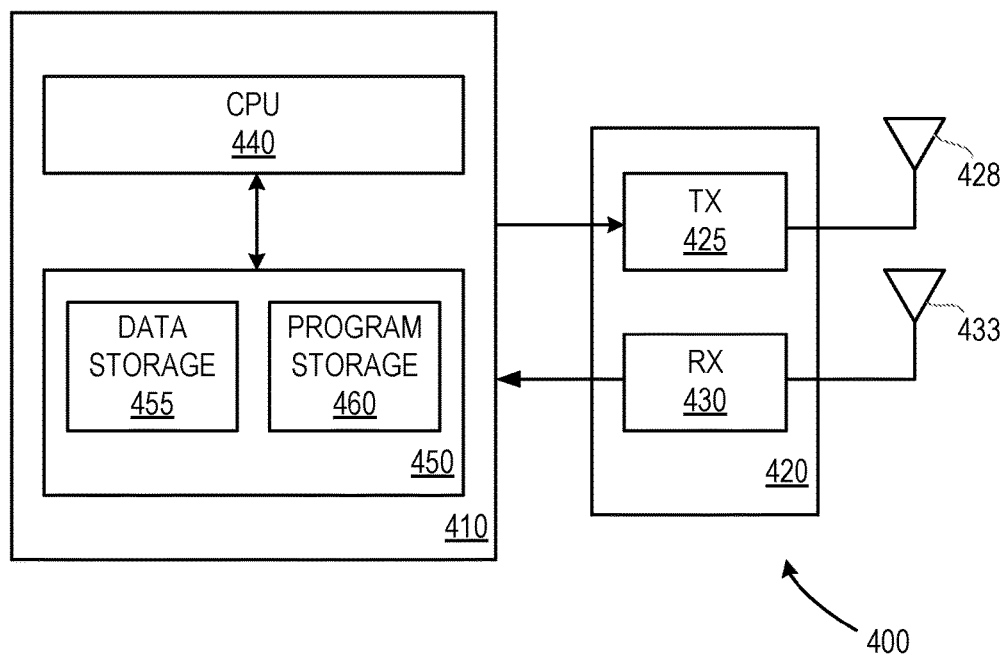
FIG. 3 is a block diagram of an exemplary terminal device according to several embodiments.

Hardware Implementations—Several of the techniques and methods described below may be implemented using radio circuitry and electronic data processing circuitry provided in a terminal device. FIG. 3 illustrates features of an example terminal device 400 according to several embodiments. Terminal device 400, which may be a UE configured for operation with an LTE network (E-UTRAN) and that also supports Wi-Fi, for example, comprises a transceiver unit 420 for communicating with one or more base stations (eNBs) as well as a processing circuit 410 for processing the signals transmitted and received by the transceiver unit 420. Transceiver unit 420 includes a transmitter 425 coupled to one or more transmit antennas 428 and receiver 430 coupled to one or more receiver antennas 433. The same antenna(s) 428 and 433 may be used for both transmission and reception. Receiver 430 and transmitter 425 use known radio processing and signal processing components and techniques, typically according to a particular telecommunications standard such as the 3GPP standards for LTE. Note also that transmitter unit 420 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques described herein, additional details are not shown here.

Processing circuit 410 comprises one or more processors 440 coupled to one or more memory devices 450 that make up a data storage memory 455 and a program storage memory 460. Processor 440, identified as CPU 440 in FIG. 3, may be a microprocessor, microcontroller, or digital signal processor, in some embodiments. More generally, processing circuit 410 may comprise a processor/firmware combination, or specialized digital hardware, or a combination thereof. Memory 450 may comprise one or several types of memory such as read-only memory (ROM), random-access memory, cache memory, flash memory devices, optical storage devices, etc. Because terminal device 400 supports multiple radio access technologies, processing circuit 410 may include separate processing resources dedicated to one or several radio access technologies, in some embodiments. Again, because the various details and engineering tradeoffs associated with the design of baseband processing circuitry for mobile devices are well known and are unnecessary to a full understanding of the techniques described herein, additional details are not shown here.

Typical functions of the processing circuit 410 include modulation and coding of transmitted signals and the demodulation and decoding of received signals. In several embodiments, processing circuit 410 is adapted, using suitable program code stored in program storage memory 460, for example, to carry out any of the embodiments described below. Of course, it will be appreciated that not all of the steps of these embodiments are necessarily performed in a single microprocessor or even in a single module.

Figure 4:
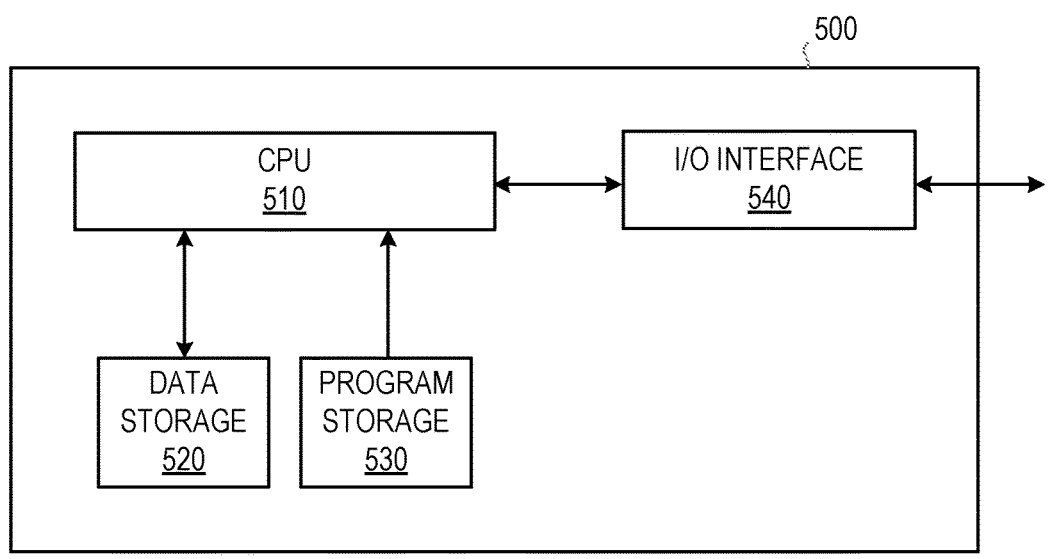
FIG. 4 is a block diagram of an exemplary network node according to several embodiments.

Similarly, several of the techniques and processes described below can be implemented in a network node, such as an eNodeB or other node in a 3GPP network. FIG. 4 is a schematic illustration of a node 500 in which a method embodying any of the presently described network-based techniques can be implemented. A computer program for controlling the node 500 to carry out a method according to any of the relevant embodiments is stored in a program storage 530, which comprises one or several memory devices. Data used during the performance of a method according to the embodiments is stored in a data storage 520, which also comprises one or more memory devices. During performance of a method embodying the present techniques, program steps are fetched from the program storage 530 and executed by a Central Processing Unit (CPU) 510, retrieving data as required from the data storage 520. Output information resulting from performance of a method embodying the presently-described techniques can be stored back in the data storage 520, or sent to an Input/Output (I/O) interface 540, which includes a network interface for sending and receiving data to and from other network nodes and which may also include a radio transceiver for communicating with one or more terminal devices.

Accordingly, in various embodiments, processing circuits, such as the CPU 510 in FIG. 4, are configured to carry out one or more of the techniques described in detail below. Likewise, other embodiments include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

As described above, mobility mechanisms (also known as access network selection and/or traffic steering or routing procedures) can be used in which a terminal device that is capable of operating in a cellular network and a WLAN evaluates a rule or rules to determine whether to steer its traffic (e.g. voice traffic, data traffic, etc.) to the cellular network or to the WLAN. In these mechanisms, it can be desirable for an operator of the cellular network to restrict the terminal device to a certain subset of the available WLANs, for example only those WLANs that belong to, are operated by, or are otherwise associated with the cellular network operator. Thus, the terminal device needs to be informed of which WLANs should be considered by the terminal device during the access network selection and/or traffic steering or routing procedure.

In the techniques described herein, the cellular network (in particular a node in the cellular network) broadcasts a WLAN list that identifies the WLANs or WLAN access point that can be considered by terminal devices when they perform the access network selection and/or traffic steering or routing procedure. The identifier for each WLAN or WLAN access point (AP) included in the WLAN list can provided in any suitable form, and may comprise, for example, a service set identification (SSID), the basic SSID (BSSID), the extended SSID (ESSID), the homogenous ESSID (HESSID) or HotSpot 2.0. Those skilled in the art will be aware of other forms of information that identify a WLAN or WLAN AP and that can be included in the WLAN list in addition to or in place of any of the above identifiers.

It will be appreciated that depending on the way in which the access network selection and/or traffic steering or routing mechanism is implemented, terminal devices may be permitted to consider further WLANs to those in the broadcast WLAN list. For example, the terminal device can be permitted to consider steering traffic to WLANs that are preconfigured in the terminal device (for example a user's home WLAN) and/or that have been identified in other information received in dedicated or broadcast signalling from the network.

Figure 5:
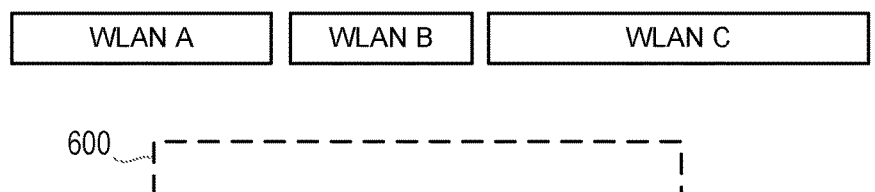
FIG. 5 is a diagram illustrating the size of a list of WLAN identifiers relative to the size of a field available in a broadcast channel for broadcasting WLAN identifiers.

FIG. 5 illustrates one of the limitations with broadcasting the list of WLAN identifiers to the terminal devices in a broadcast channel, namely that it may not be feasible from an overhead point of view to signal all of the required WLAN identifiers in the list in a single transmission to the terminal devices. In the example of FIG. 5 three WLAN identifiers: WLAN A, WLAN B and WLAN C, form a list of WLAN identifiers that are to be broadcast to the terminal devices. The three WLAN identifiers are of different sizes (although it is possible for different WLAN identifiers to be the same size), with WLAN identifier C being the largest (i.e. having the most bits), and WLAN identifier B is the smallest (i.e. having the fewest bits). The total size of the list may be very large and it may not be suitable or possible to signal the list in one go. Moreover, broadcasting resources are shared among several different types of broadcasted messages, and therefore broadcasting one very large piece of information reduces the broadcasting capacity available for other types of broadcast information, which is undesirable. FIG. 5 illustrates a block (or field) 600 in the broadcast channel (which in some types of cellular network is referred to as a 'system information block' or SIB) that is reserved for the broadcast of a list of WLAN identifiers to the terminal devices. The block 600 is typically of a fixed size. It can be seen that block 600 is too small to carry all of the information for WLAN A, WLAN B and WLAN C in one transmission.

Thus, as described above, in the techniques described herein, the cellular network divides the list of WLAN identifiers into a plurality of segments, with each segment being suitably sized so that it can be signalled in a field or block of a broadcast channel that is set aside or reserved for WLAN list broadcast. The cellular network then broadcasts these segments in a sequential manner over the broadcast channel to the terminal devices. Over a number of transmissions of the blocks or fields in the broadcast channel, the terminal devices receive all of the required segments and combine them to obtain the complete WLAN list. As the reception of the WLAN list information is not time critical, the distribution of the WLAN list information over time does not have any adverse impact on the intended use of the WLAN identifier information.

Figure 6:
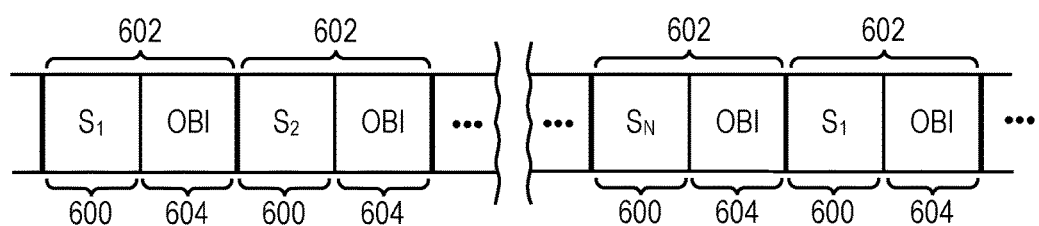
FIG. 6 is a diagram illustrating the sequential broadcast of segments of a list of WLAN identifiers.

The sequential broadcast of the segments is illustrated in FIG. 6. In this Figure, one complete transmission of the broadcast information is shown by frame 602, with frame 602 comprising the block or field 600 that is used for WLAN list information and a block or field 604 that is used for all other broadcast information (denoted OBI in the Figure). In this Figure, the WLAN list has been segmented into N segments, denoted $S_1$, $S_2$, . . . , $S_N$, and each segment is broadcast sequentially in block 600 of consecutive frames 602. Thus, in a first frame 602, $S_1$ is broadcast in block 600. In the next frame $S_2$ is broadcast in block 600. This sequence continues until the N-th frame 602 in which segment $S_N$ is broadcast in block 600. As all of the segments of the WLAN list have now been broadcast (which is referred to herein as a WLAN identifier provisioning cycle), in the next frame 602 (the $(N+1)^{th}$ frame), the first segment of the WLAN list ($S_1$) is broadcast again, and the sequence repeats.

It will be appreciated that blocks 600 and 604 are not shown to scale, and block 600 may take up a much smaller portion of the total information to be broadcast in a single frame 602 than illustrated in FIG. 6. Moreover, it will be appreciated that the block 600 set aside for the broadcast of a WLAN list may not necessarily be provided at the start of the broadcast frame 602 as shown in FIG. 6, but it may be found in any part of a frame 602.

Figure 7:
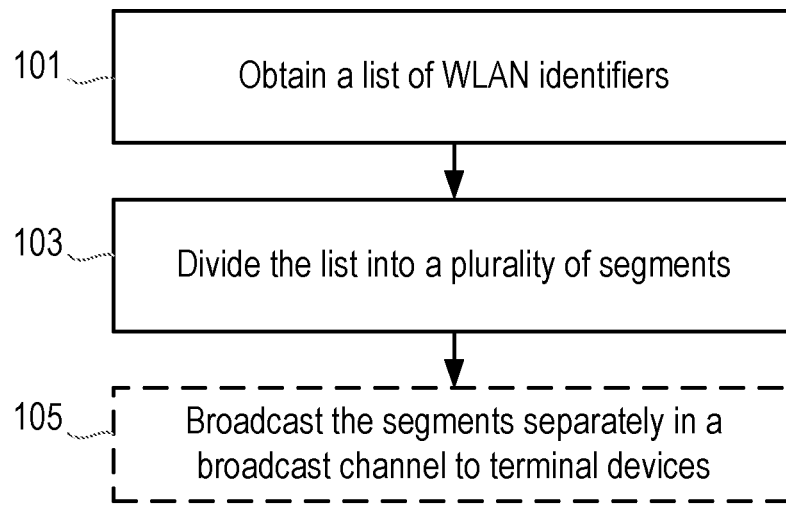
FIG. 7 is a flow chart illustrating a method of operating a network node according to an embodiment.

The flow chart in FIG. 7 illustrates a method of operating a network node 500 in a cellular network according to the techniques described herein. The network node 500 may be a node that has a radio interface 540 with the terminal devices 400, such as a base station, NodeB, eNodeB, etc., or a node in another part of the network, such as an RNC, S-GW, P-GW, MME, etc.

In a first step, step 101, a list of WLAN identifiers is obtained by the network node 500. The list of WLAN identifiers may comprise identifiers of WLANs for a certain part of the network, such as a particular cell associated with the network node 500. The content of the list may be provided by the network operator, or it may be generated from information indicating which WLANs are in a certain part of the network. The list may be generated by the network node 500 itself, or it may be received from another node in the network.

As the list of WLAN identifiers is too large to be broadcast to the terminal devices 400 in one broadcast block or field 600, the list of WLAN identifiers is divided into a plurality of segments (step 103). There are several ways in which the list can be divided into segments, and various embodiments for dividing the WLAN list into segments are described in more detail below.

The segments are then sequentially broadcast to the terminal devices 400 as shown in FIG. 6 (step 105). Step 105 comprises either broadcasting the segments by the network node 500 itself if the network node 500 has a radio interface with the terminal devices 400, or transmitting the segment information to another network node 500 for broadcast to the terminal devices 400 if the network node 500 is a node in a higher part of the cellular network.

Figure 8:
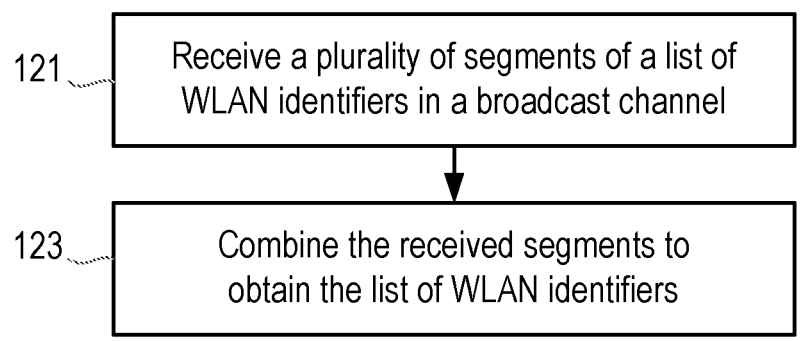
FIG. 8 is a flow chart illustrating a method of operating a terminal device according to an embodiment.

The flow chart in FIG. 8 illustrates a corresponding method of operating a terminal device 400 to obtain a list of WLAN identifiers according to the techniques described herein. In a first step, step 121, the terminal device 400 receives a plurality of segments of a WLAN list in a broadcast channel. As described above, the terminal device 400 receives a segment of the WLAN list in each block 600 in the broadcast channel, and over time (i.e. over a complete WLAN identifier provisioning cycle), the terminal device 400 receives all of the required segments.

In step 123, the terminal device 400 combines the segments to obtain the complete list of WLAN identifiers. It will be appreciated that in some implementations step 123 can be initiated only when the terminal device 400 has received all of the segments, or it can be initiated before all of the segments for a WLAN list have been received from the network.

As noted above, different methods for segmenting the list of WLAN identifiers can be used. A few examples of segmentation are described below. In the following examples, it is assumed that the sizes of the WLAN identifiers are as follows: WLAN A is 15 bytes, WLAN B is 10 bytes and WLAN C is 20 bytes. The complete list of WLAN identifiers is thus 45 bytes. The block or field 600 for broadcasting WLAN identifiers is of a fixed size of 30 bytes.

Figure 9:
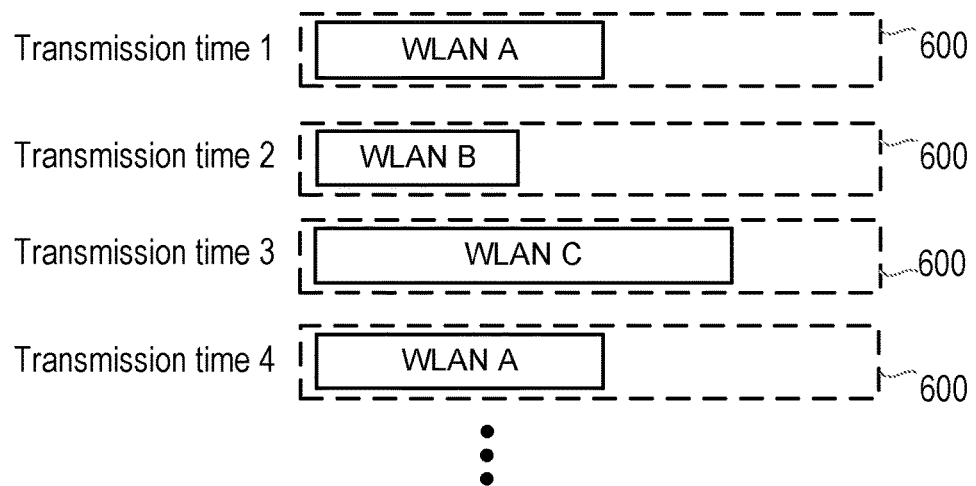
FIG. 9 is a diagram illustrating a first way in which a list of WLAN identifiers can be segmented.

In one segmentation method, the WLAN identifiers are split or segmented such that in each transmission opportunity of the field 600 that carries the WLAN identifiers, one WLAN identifier is signalled. This is illustrated in FIG. 9. Each instance of block 600 (indicated by 'Transmission time 1', 'Transmission time 2', etc.) contains one WLAN identifier (e.g. WLAN A, WLAN B or WLAN C) and, if the length of the WLAN identifier is shorter than the length of the block 600, the block 600 also contains some unused bits (referred to herein as 'padding' bits). This segmentation method may reduce network and terminal device complexity since WLAN identifiers are not split over different transmission occurrences.

It should be noted the use of the terms "Transmission time 1", "Transmission time 2", "Transmission time 3", and so on, is for illustrative purposes and it does not mean that the terminal device 400 must receive the information sent at "Transmission time 1" before receiving the information in "Transmission time 2". For example (as will be described in more detail below), the terminal device 400 may enter a cell some time between "Transmission time 1" and "Transmission time 2" and the first segment of the WLAN list received by the terminal device 400 may be that transmitted at Transmission time 2.

In some embodiments, the network node may broadcast an indication of the length of the WLAN identifier so that the processing circuit 410 in the terminal device 400 can distinguish between the WLAN identifier and the padding. Without knowing this length information the decoding of the WLAN identifier is not possible. The length indication can be defined as a separate field which is transmitted together with the segment within the same block 600 or appended to the beginning of the segment. Another possibility to indicate to the terminal device 400 the length of the WLAN identifier information and/or the padding is to insert a marker after the WLAN identifier information to identify the end of the WLAN identifier. This marker could take the form of, for example, a special or dedicated bit-sequence or a special character added to the final WLAN identifier, etc.

Figure 10:
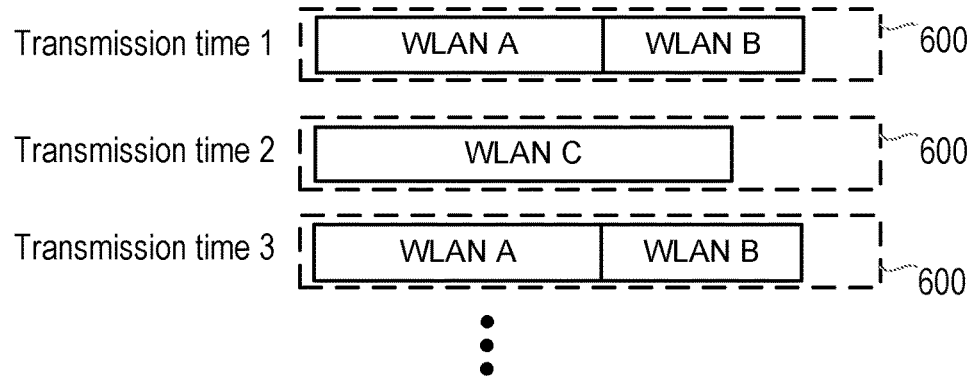
FIG. 10 is a diagram illustrating another way in which a list of WLAN identifiers can be segmented.

In another segmentation method, multiple (complete) WLAN identifiers are transmitted in the field 600 reserved for carrying the WLAN identifiers, where this is possible. This is illustrated in FIG. 10. In the example above, with WLAN A being 15 bytes, WLAN B being 10 bytes and WLAN C being 20 bytes and the block or field 600 for broadcasting WLAN identifiers being 30 bytes, it is possible to broadcast WLAN A and WLAN B in field 600 at the same time, and hence the total time required to signal the complete list of WLAN identifiers can be reduced compared to the first method above. As in the first method above, padding bits can be included in the block 600 where the WLAN identifier(s) are shorter than the length of the block 600.

As in the above example, the terminal device 400 needs to know the length of the WLAN identifier(s) included in the block 600 and the number of WLAN identifiers in the block 600 in order to read the WLAN identifiers correctly. An indication of the length(s) and the number of WLAN identifiers per segment could again be defined as separate protocol fields, e.g. of type lists, which are further transferred within the same block 600 as the segment of the WLAN list itself. Alternatively the information could be appended to the beginning of the segment. It is alternatively possible to add a marker between two WLAN identifiers to indicate the end of one WLAN identifier and the start of another WLAN identifier.

Figure 11:
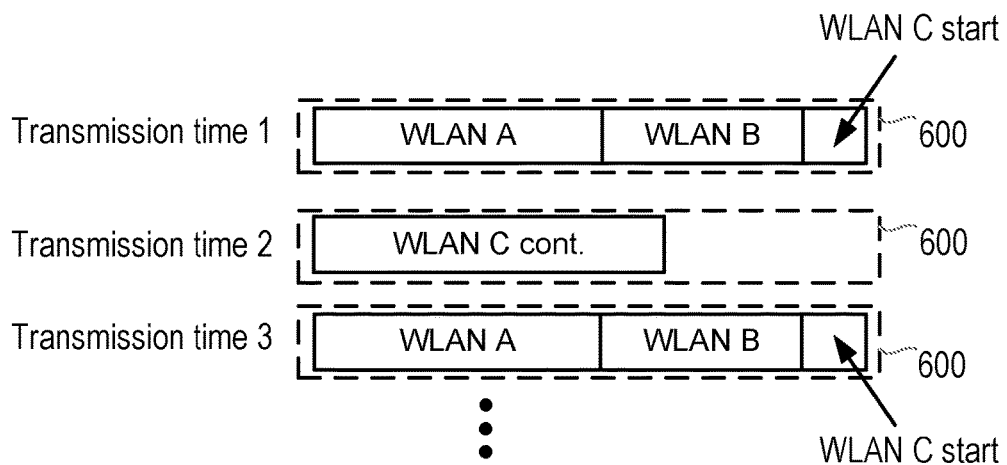
FIG. 11 is a diagram illustrating yet another way in which a list of WLAN identifiers can be segmented.

In a third segmentation method, illustrated in FIG. 11, the whole of the block 600 can be used to broadcast WLAN identifiers, which means that any given WLAN identifier can be split over different transmission times. In other words, the field 600 carrying the WLAN identifiers is filled with WLAN identifier information during each broadcast. As shown in FIG. 11, WLAN A and WLAN B are completely broadcast in block 600 at transmission time 1, and part of WLAN C in also included in that block 600. The rest of WLAN C is broadcast in block 600 at transmission time 2. In this embodiment, the terminal device 400 needs to know or recognise that WLAN identifier C is split between two segments. An indication of the split could be defined, e.g. as a separate protocol field of type BOOLEAN, which could indicate whether the last segment contains complete WLAN identifiers or not (e.g. FALSE means that the last WLAN identifier is not complete, TRUE means that it is complete). In that way, the terminal device 400 can know whether or not the WLAN identifier C continues in the next block 600. Similarly, another indication could be provided that informs the terminal device 400 that the beginning of the segment (or the complete segment) is a continuation of the transmission of a WLAN identifier. This indication could also be of type BOOLEAN, where, e.g., FALSE means that the segment does not contain continued transmission of a WLAN identifier. This would help a terminal device 400 that has not received a full cycle of WLAN identifiers, i.e. a terminal device 400 that has not received any earlier fragments of the WLAN identifier, to ignore the reception of the segment and thereby prevent erroneous decoding of a WLAN identifier.

Even though in this particular example the number of transmission times required to signal the complete WLAN list to the terminal devices is the same as in the second example above, it will be appreciated that this segmentation method has the possibility of further reducing the number of transmission times needed to signal all WLAN identifiers compared to the second method. This segmentation method also allows for signalling of WLAN identifiers that are larger than the field 600 which carries the WLAN identifiers.

As an alternative to using fixed sized blocks 600, flexible-sized blocks 600 can be used where, for example, the block 600 conveys only one WLAN identifier at any given time, and the number of octets in the block 600 agrees with the length of the broadcast WLAN identifier. This could be done by containing the WLAN identifier as an ASN.1 octet string where the encoding rules would automatically take care of the length indication and necessary information for decoding. Thus the advantage of this method is that there is no need to use or provide separate length indicators (or any other indicators). The downside is that only one WLAN identifier could be broadcast during each transmission time.

An example of how to introduce WLAN identifier segmentation into EUTRA System Information Broadcast (SIB) is exemplified in FIG. 12 below for fixed sized segmentation and SIB type 2 assuming a fixed segment size of 30 bytes. It is necessary to create a non-critical extension to the SIB and further define a new information element (IE), which is for illustrative purposes termed as WIanIdentiferInfo-r12 to convey the segment as an octet string.

The IE SystemInformationBlockType2 contains radio resource configuration information that is common for all UEs (terminal devices). It should be noted that UE timers and constants related to functionality for which parameters are provided in another SIB are included in the corresponding SIB.

| SystemInformationBlockType2 information element |
|---|

```
-- ASN1START
SystemInformationBlockType2 ::=      SEQUENCE {
    ac-BarringInfo                   SEQUENCE {
        ac-BarringForEmergency           BOOLEAN,
        ac-BarringForMO-Signalling       AC-BarringConfig        OPTIONAL,   -- Need OP
        ac-BarringForMO-Data             AC-BarringConfig        OPTIONAL    -- Need OP
                                                                 OPTIONAL,   -- Need OP
    }
    radioResourceConfigCommon        RadioResourceConfigCommonSIB,
    ue-TimersAndConstants            UE-TimersAndConstants,
    freqInfo                         SEQUENCE {
        ul-CarrierFreq                   ARFCN-ValueEUTRA        OPTIONAL,   -- Need OP
        ul-Bandwidth                     ENUMERATED {n6, n15, n25, n50, n75, n100}
                                                                 OPTIONAL,   -- Need OP
        additionalSpectrumEmission       AdditionalSpectrumEmission
    },
    mbsfn-SubframeConfigList         MBSFN-SubframeConfigList    OPTIONAL,   -- Need OR
    timeAlignmentTimerCommon         TimeAlignmentTimer,
    ...,
    lateNonCriticalExtension         OCTET STRING (CONTAINING SystemInformationBlockType2-v8h0-IEs)
            OPTIONAL,        -- Need OP
    [[  ssac-BarringForMMTEL-Voice-r9   AC-BarringConfig         OPTIONAL,   -- Need OP
        ssac-BarringForMMTEL-Video-r9   AC-BarringConfig         OPTIONAL    -- Need OP
    ]],
    [[  ac-BarringForCSFB-r10           AC-BarringConfig         OPTIONAL    -- Need OP
    ]]
}
SystemInformationBlockType2-v8h0-IEs ::=      SEQUENCE {
    multiBandInfoList                SEQUENCE (SIZE (1..maxMultiBands)) OF AdditionalSpectrumEmission
            OPTIONAL,        -- Need OR
    nonCriticalExtension             SystemInformationBlockType2-v9e0-IEs     OPTIONAL    -- Need OP
}
SystemInformationBlockType2-v9e0-IEs ::= SEQUENCE {
    ul-CarrierFreq-v9e0              ARFCN-ValueEUTRA-v9e0       OPTIONAL,   -- Cond ul-FreqMax
    nonCriticalExtension             SystemInformationBlockType2-v12xy-IEs    OPTIONAL
SystemInformationBlockType2-v12xy-IEs ::= SEQUENCE {
    wlanIdentifier-r12               WlanIdentifier-r12          OPTIONAL,
    nonCriticalExtension             SEQUENCE { }                OPTIONAL    -- Need OP
}
AC-BarringConfig ::=             SEQUENCE {
    ac-BarringFactor                 ENUMERATED {
                                         p00, p05, p10, p15, p20, p25, p30, p40,
                                         p50, p60, p70, p75, p80, p85, p90, p95},
    ac-BarringTime                   ENUMERATED {s4, s8, s16, s32, s64, s128, s256, s512},
    ac-BarringForSpecialAC           BIT STRING (SIZE(5))
}
MBSFN-SubframeConfigList ::=     SEQUENCE (SIZE (1..maxMBSFN-Allocations)) OF MBSFN-SubframeConfig
-- ASN1STOP
```

| SystemInformationBlockType2 field descriptions |
|---| ac-BarringFactor
If the random number drawn by the UE is lower than this value, access is allowed. Otherwise the access is barred. The values are interpreted in the range [0, 1): p00 = 0, p05 = 0.05, p10 = 0.10, ... , p95 = 0.95. Values other than p00 can only be set if all bits of the corresponding ac-BarringForSpecialAC are set to 0.
ac-BarringForCSFB
Access class barring for mobile originating CS fallback.
ac-BarringForEmergency
Access class barring for AC 10.
ac-BarringForMO-Data
Access class barring for mobile originating calls.
ac-BarringForMO-Signalling
Access class barring for mobile originating signalling.
ac-BarringForSpecialAC
Access class barring for AC 11-15. The first/leftmost bit is for AC 11, the second bit is for AC 12, and so on.
ac-BarringTime
Mean access barring time value in seconds.
additionalSpectrumEmission
The UE requirements related to IE AdditionalSpectrumEmission are defined in TS 36.101 [42, table 6.2.4.1].
mbsfn-SubframeConfigList
Defines the subframes that are reserved for MBSFN in downlink.
multiBandInfoList -continued

| SystemInformationBlockType2 field descriptions |
|---|

A list of additionalSpectrumEmission i.e. one for each additional frequency band included in multiBandInfoList in SystemInformationBlockType1, listed in the same order.
ssac-BarringForMMTEL-Video
Service specific access class barring for MMTEL video originating calls.
ssac-BarringForMMTEL-Voice
Service specific access class barring for MMTEL voice originating calls.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.

| Conditional presence | Explanation |
|---|---|
| ul-FreqMax | The field is mandatory present if ul-CarrierFreq (i.e. without suffix) is present and set to maxEARFCN. Otherwise the field is not present. |

The IE WlanIdentifierinfo-r12 is used to transfer WLAN Identifiers to the UE. The radio resource control (RRC) layer is transparent for this information.

| WlanIdentifierInfo information element |
|---|
| -- ASN1START<br>WlanIdentifierInfo-r12 ::=     OCTET STRING (SIZE(30))<br>-- ASN1STOP |

Segmentation with using a flexible block 600 could be realised by making a small modification to the WlanIdentifierinfo-r12 information element to remove the size declaration from the octet string definition. Otherwise the coding remains unchanged (see below).

| WlanIdentifierInfo information element |
|---|
| -- ASN1START<br>WlanIdentifierInfo-r12 ::=     OCTET STRING<br>-- ASN1STOP |

It will be appreciated that it may be necessary for a terminal device 400 to identify the end of a WLAN identifier provisioning cycle in order for the terminal device 400 to know when a complete WLAN list has been received. Different approaches exist for this, as will be described below.

One approach is that a marker is added to the end of the last block 600 in the cycle (or at the beginning of the first block 600 in the cycle) to identify the end (or beginning) of a WLAN identifier provisioning cycle. A terminal device 400 would know that one cycle is the information between two consecutive such markers. This approach is illustrated in FIG. 12. A marker 606 is added to the end of the last block 600 in the cycle.

The marker 606 identifying the beginning or end of a cycle could be realised for example by providing a bit-flag, a special or dedicated bit-sequence or a special character added to the first or final WLAN identifier, etc.

Another possible embodiment of the end marker 606 is to redefine the WlanIdentifierinfo-r12 IE as a sequence and add the end marker 606 as an optionally present indicator within the sequence. An example of this IE is shown below.

| WlanIdentifierInfo information element |
|---|
| -- ASN1START<br>WlanIdentifierInfo-r12 ::= SEQUENCE {<br>    wlanIdentifier    OCTET STRING,<br>    endMarker    ENUMERATED { endOfCycle }    OPTIONAL<br>}<br>-- ASN1STOP |

| SystemInformationBlockType2 field descriptions |
|---|
| wlanIdentifier<br>Octet string that contains a WLAN identifier. The information is transparent to RRC layer.<br>endMarker<br>The IE is present at the end of a wlan identifier provisioning cycle to indicate end-of-cycle. Otherwise it is absent. |

As indicated above, it would also be possible for the marker 606 to indicate the beginning of a cycle. An example of this IE is shown below.

| WlanIdentifierInfo information element |
|---|
| -- ASN1START<br>WlanIdentifierInfo-r12 ::= SEQUENCE {<br>    wlanIdentifier    OCTET STRING,<br>    endMarker    ENUMERATED { beginningOfCycle }    OPTIONAL<br>}<br>-- ASN1STOP |

| SystemInformationBlockType2 field descriptions |
|---|
| wlanIdentifier<br>Octet string that contains a WLAN identifier. The information is transparent to RRC layer.<br>endMarker<br>The IE is present at the beginning of a wlan identifier provisioning cycle to indicate beginning-of-cycle. Otherwise it is absent. |

Another approach is that the terminal device 400 identifies that there has been a complete WLAN identifier provisioning cycle from a repetition of the information in the field 600 used for WLAN identifier provisioning. In the above examples, the terminal device 400 could identify that a complete cycle has passed when it again reads a complete or a part of a WLAN identifier that it has already read.

Figure 12:
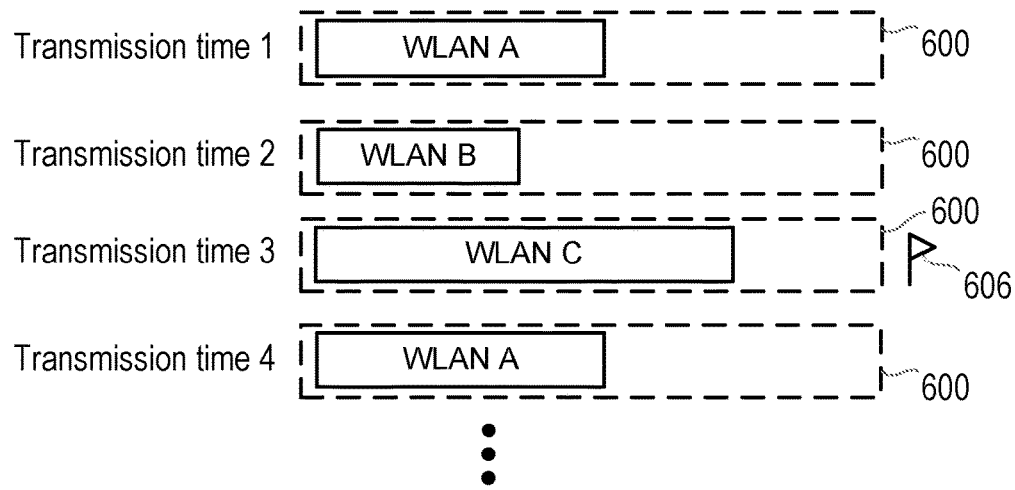
FIG. 12 is a diagram illustrating how the end of a cycle of segments can be indicated to terminal devices.

If this approach was applied to the segmentation example illustrated in FIG. 12, then if the terminal device 400 receives a first WLAN identifier field 600 at transmission time 2 then the terminal device 400 would, at transmission time 5 in which WLAN identifier B is signalled (not shown in FIG. 12), know that a complete cycle has passed as the terminal device 400 would then (again) read WLAN identifier B.

This approach, i.e. without the use of an end marker, has reduced network complexity as the network does not need to add the marker; and furthermore it avoids the additional signalling that the end marker would introduce.

Ensuring Up-to-Date WLAN Identifiers

It is important for the successful operation of the access network selection and/or traffic steering or routing mechanism that a terminal device 400 has up-to-date information on WLAN identifiers, such that the WLAN identifiers that the network wants the terminal device 400 to consider are actually considered by the terminal device 400. For example, if initially a terminal device 400 should consider WLAN A and WLAN B, but at a later time the network requires the terminal device 400 to consider WLAN A and WLAN C, then there is a need for the terminal device to obtain up-to-date WLAN identifiers.

It will be appreciated that unless otherwise indicated below, the techniques described below for obtaining an up-to-date list of WLAN identifiers are applicable not only to obtaining an up-to-date list of WLAN identifiers where the list is divided into a plurality of segments and broadcast separately to terminal devices, but also to implementations where the complete list is broadcast to the terminal devices in one transmission and/or where the complete list is transmitted to terminal devices using dedicated signalling.

One way in which a terminal device 400 can ensure it has an up-to-date list of WLAN identifiers is to continuously read the field 600 used for provisioning of WLAN identifiers. However, the contents of the WLAN identifier list may not change often, and hence it is a waste of power by the terminal device to be continuously reading this field 600.

In the 3GPP specifications (for example in section 5.2.1.3 of the 3GPP specification TS 36.331 v.11.6.0) a flag is signalled by the RAN called systemInfoValueTag that is updated whenever there is a modification of the information carried by the broadcast channel. This flag is used to indicate to terminal devices 400 that a modification has been made to the broadcast channel which requires the terminal device 400 to re-read the broadcast channel to get up-to-date information. It will be appreciated that implementing the list segmentation embodiments described herein will result in the broadcast channel changing every transmission time since the field 600 will carry different WLAN identifier information with each transmission, and this will result in the systemInfoValueTag changing every transmission time.

Thus, it would be beneficial if a change of the contents of the field 600 used for WLAN identifier provisioning does not trigger a change of the systemInfoValueTag. However other mechanisms are then needed to ensure that the terminal device 400 obtains and maintains an up-to-date list of WLAN identifiers.

In the following, two scenarios are described in which it can be ensured that the terminal device 400 has up-to-date WLAN identifiers without the terminal device 400 having to continuously read the broadcast channel. This is achieved by the terminal device 400 acquiring the WLAN identifiers when the current WLAN identifiers are considered outdated.

Figure 13:
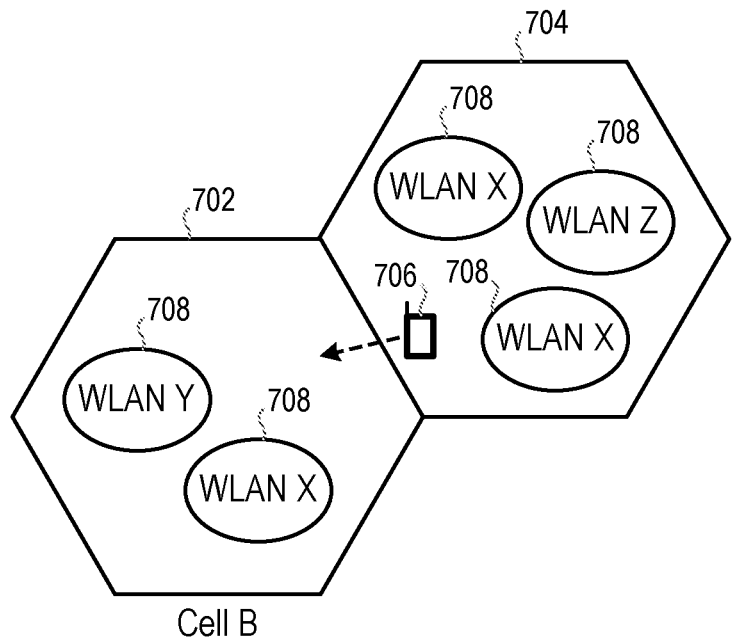
FIG. 13 is a diagram illustrating the movement of a terminal device from one cell to another.

Cell change scenario—As a terminal device 400 moves around in the coverage area of the network the serving cell of the terminal device 400 can change. This scenario is illustrated in FIG. 13. In this example a terminal device 706 is initially being served by a first cell 704 (Cell A) and then the terminal device 706 moves into the coverage area of a second cell 702 (Cell B) and hence the terminal device 706 changes serving cell to Cell B 702. In Cell A 704 the preferred (and available) WLANs 708 are WLAN X and WLAN Z, while in Cell B 702 the preferred (and available) WLANs 708 are WLAN X and WLAN Y.

Upon a change in serving cell from a first cell (like Cell A 704 in the above example) to a second cell (like Cell B 702 in the above example), the terminal device 706 could be configured to automatically consider the WLAN identifiers received for the first cell to be outdated. The terminal device 706 would then know to acquire the up-to-date WLAN identifiers from the second cell.

Alternatively, the terminal device 706 could consider the WLAN identifiers for a previous cell outdated when WLAN identifiers for a new serving cell have been received. Thus, in the example of FIG. 13, from the point that the terminal device 706 starts being served by Cell B 702 up until the point where the terminal device 706 receives updated WLAN identifier information for Cell B 702, the terminal device 706 can continue to consider WLAN X and WLAN Z up-to-date WLAN identifiers until the terminal device 706 receives the new WLAN identifier information for Cell B 702 (i.e. WLAN X and WLAN Y). In this particular example since WLAN X should be considered by the terminal device 706 in both cells 702, 704, it is beneficial that the terminal device 706 only determines that WLAN identifiers are outdated when a new list of WLAN identifiers has been received since some identifiers may be common for the two cells.

In the two sections below, techniques are described for the handling of outdated WLAN identifiers.

Connection handling with regards to outdated WLANs—According to one method the terminal device 706 is configured to refrain from connecting to WLANs having WLAN identifiers that are considered outdated. In some methods, in the event that the terminal device 706 is connected to a WLAN having an identifier that is now outdated, the terminal device 706 can be configured to disconnect from the 'outdated' WLAN.

As used herein, a terminal device 706 being "connected" to WLAN can mean any of several different things, as exemplified by the existence of one or more of the below conditions:

802.11 authentication (Authentication to the WLAN AP) has been completed or is under way;

802.1x extensible authentication protocol for subscriber identity module EAP-SIM authentication (Authentication to the authentication, authorisation and accounting (AAA)-servers) has been completed or is under way;

Four way hand-shake between the terminal and the WLAN network has been completed;

An IP address has been assigned to the terminal in WLAN;

a packet data network (PDN) connection has been established through the WLAN network, i.e., a connection between the terminal and the PDN gateway;

Data traffic has been started through the WLAN network.

In some scenarios it may be beneficial for the terminal device 706 to stay connected to WLANs 708 having 'outdated' WLAN identifiers. One scenario in which this is beneficial is where a WLAN 708 is covering the border of two cells. If the terminal device 706 has connected to that WLAN 708 when being served by the first cell 704, it may be beneficial to allow the terminal device 706 to stay connected to that WLAN 708 to avoid service interruptions even though the WLAN 708 may be considered "outdated". Consider a scenario where the terminal device 706 has an ongoing data transmission using that WLAN 708 when WLAN 708 becomes 'outdated'. In this case it may degrade the user experience if the terminal device 706 disconnects from that WLAN 708.

Storing or discarding of outdated WLAN identifiers—The terminal device 706 may be configured to discard WLAN identifiers that are considered outdated. This is beneficial to avoid unnecessary memory usage in the terminal device 706.

In some scenarios it may also be beneficial that the terminal device 706 retains outdated WLAN identifiers in memory 450. If the terminal device 706 retains outdated WLAN identifiers (and perhaps an indication of the cell to which the WLAN identifiers apply) the terminal device 706 may, upon re-entering the cell from which it received the outdated WLAN identifiers, start using the stored WLAN identifiers for that cell in the access network selection and/or traffic steering or routing procedure.

For example, in the scenario of FIG. 6, the terminal device 706 is initially in Cell A 704 and then enters Cell B 702. If the terminal device 706 retained the WLAN identifiers it received in Cell A 704 it could, upon re-entering Cell A 704 already know which WLAN identifiers are to be considered in Cell A 704 without needing to receive them from the network, which saves power.

The terminal device 706 could identify the cells 702, 704, and whether it re-enters a cell, by identifying a cell index for the cells. For example, in LTE a cell can be identified by a cell identity (CI) such as a physical layer cell identity (PCI) or the global cell identity (GCI).

An embodiment for EUTRA would be a UE variable that stores a list of WLAN identifier IEs together with their respective cell IDs. An example of the variable is shown below with a maximum of 10 instances per list and with a maximum of 3 WLAN identifiers per cell.

The UE variable VarWlanIdentifierInfoList includes information about the stored WLAN identifiers per cell.

| VarWlanIdentifierInfoList UE variable | |
|---|---|
| -- ASN1START | |
| VarWlanIdentifierInfoList ::= VarWlanIdentifierInfo | SEQUENCE (SIZE (1..10)) OF |
| VarWlanIdentifierInfo ::= | SEQUENCE { |
|   cellIdentity | CellIdentity, |
|   VarWlanIdentifierList | SEQUENCE (SIZE (1..3)) OF |
| VarWlanIdentifier | |
| } | |
| VarWlanIdentifier ::= | OCTET STRING |
| -- ASN1STOP | |

Whether the terminal device 706 should consider stored or retained WLAN identifiers up-to-date upon re-entering a cell or not could be configured by the network, for example with a flag indicating this in a broadcast or dedicated signalling message.

The method of considering stored WLAN identifiers up-to-date could be further improved by having an expiration time associated with outdated WLAN identifiers. This expiration time would tell the terminal device 706 how much time can elapse between exiting a cell and re-entering the same cell for the stored WLAN identifiers for that cell to be considered up-to-date. This embodiment can be used to prevent the terminal device 706 from considering the WLAN identifiers to be up-to-date if they were received too long ago, which is beneficial in case the WLAN identifiers for a particular cell change over time.

Considering again the example in FIG. 13, the terminal device 706 starts in Cell A 704 and then enters Cell B 702, where it retains the WLAN identifiers for Cell A in memory 450. If the terminal device 706 subsequently re-enters Cell A 704 before the expiration time associated with the WLAN identifiers for Cell A 704 has passed, the terminal device 706 could consider the stored WLAN identifiers for Cell A to be up-to-date without needing to receive them again. The terminal device 706 would discard the WLAN identifiers for Cell A 704 when the expiration time has elapsed.

The expiration time could, for example, be specified in a 3GPP specification, determined autonomously by the terminal device 706 or configured by the network. The network may determine an appropriate expiration time based on available information about how often the WLAN identifiers for a cell are expected to change.

One possible embodiment is to indicate the expiration time in the system information broadcast. The value could be configurable, which means that it could be configured by the network. However, if the value is constant, it does not need to be included in the broadcast message. An example is shown below where a new protocol field termed as expirationTime is added in a non-critical extension. Note that the example below includes the modification to SIB type 2 described above.

| SystemInformationBlockType2 information element | | | |
|---|---|---|---|
| -- ASN1START | | | |
| SystemInformationBlockType2 ::= | SEQUENCE { | | |
|   ac-BarringInfo | SEQUENCE { | | |
|     ac-BarringForEmergency | BOOLEAN, | | |
|     ac-BarringForMO-Signalling | AC-BarringConfig | OPTIONAL, | -- Need OP |
|     ac-BarringForMO-Data | AC-BarringConfig | OPTIONAL | -- Need OP |
|   } | | OPTIONAL, | -- Need OP |
|   radioResourceConfigCommon | RadioResourceConfigCommonSIB, | | |
|   ue-TimersAndConstants | UE-TimersAndConstants, | | |
|   freqInfo | SEQUENCE { | | |
|     ul-CarrierFreq | ARFCN-ValueEUTRA | OPTIONAL, | -- Need OP |
|     ul-Bandwidth | ENUMERATED {n6, n15, n25, n50, n75, n100} | | |
| | | OPTIONAL, | -- Need OP |
|     additionalSpectrumEmission | AdditionalSpectrumEmission | | |
|   }, | | | |
|   mbsfn-SubframeConfigList | MBSFN-SubframeConfigList | OPTIONAL, | -- Need OR |
|   timeAlignmentTimerCommon | TimeAlignmentTimer, | | |
|   ..., | | | |
|   lateNonCriticalExtension | OCTET STRING (CONTAINING SystemInformationBlockType2-v8h0-IEs) | | |
| | OPTIONAL, | -- Need OP | |

-continued

| SystemInformationBlockType2 information element | | | |
|---|---|---|---|
| [[ ssac-BarringForMMTEL-Voice-r9 | AC-BarringConfig | OPTIONAL, | -- Need OP |
| ssac-BarringForMMTEL-Video-r9 | AC-BarringConfig | OPTIONAL | -- Need OP |
| ]], | | | |
| [[ ac-BarringForCSFB-r10 | AC-BarringConfig | OPTIONAL | -- Need OP |
| ]] | | | |
| } | | | |
| SystemInformationBlockType2-v8h0-IEs ::= | SEQUENCE { | | |
| multiBandInfoList | SEQUENCE (SIZE (1..maxMultiBands)) OF AdditionalSpectrumEmission | | |
| OPTIONAL, -- Need OR | | | |
| nonCriticalExtension | SystemInformationBlockType2-v9e0-IEs | OPTIONAL | -- Need OP |
| } | | | |
| SystemInformationBlockType2-v9e0-IEs ::= SEQUENCE { | | | |
| ul-CarrierFreq-v9e0 | ARFCN-ValueEUTRA-v9e0 | OPTIONAL, | -- Cond ul-FreqMax |
| nonCriticalExtension | SystemInformationBlockType2-v12xy-IEs | | OPTIONAL |
| SystemInformationBlockType2-v12xy-IEs ::= SEQUENCE { | | | |
| wlanIdentifier-r12 | WlanIdentifier-r12 | OPTIONAL, | |
| expirationTime | INTEGER (1..maxExpTime) | OPTIONAL, | |
| nonCriticalExtension | SEQUENCE { } | OPTIONAL | -- Need OP |
| } | | | |
| AC-BarringConfig ::= | SEQUENCE { | | |
| ac-BarringFactor | ENUMERATED { | | |
| | p00, p05, p10, p15, p20, p25, p30, p40, | | |
| | p50, p60, p70, p75, p80, p85, p90, p95}, | | |
| ac-BarringTime | ENUMERATED {s4, s8, s16, s32, s64, s128, s256, s512}, | | |
| ac-BarringForSpecialAC | BIT STRING (SIZE(5)) | | |
| } | | | |
| MBSFN-SubframeConfigList ::= | SEQUENCE (SIZE (1..maxMBSFN-Allocations)) OF MBSFN-SubframeConfig | | |
| -- ASN1STOP | | | |

| SystemInformationBlockType2 field descriptions |
|---|
| ac-BarringFactor |
| If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0. |
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/leftmost bit is for AC 11, the second bit is for AC 12, and so on. |
| ac-BarringTime |
| Mean access barring time value in seconds. |
| additionalSpectrumEmission |
| The UE requirements related to IE AdditionalSpectrumEmission are defined in TS 36.101 [42, table 6.2.4.1]. |
| expirationTime |
| The IE defines how long time the UE is required to store WLAN identifier after leaving the cell. The expiration time is defined in terms of seconds. |
| mbsfn-SubframeConfigList |
| Defines the subframes that are reserved for MBSFN in downlink. |
| multiBandInfoList |
| A list of additionalSpectrumEmission i.e. one for each additional frequency band included in multiBandInfoList in SystemInformationBlockType1, listed in the same order. |
| ssac-BarringForMMTEL-Video |
| Service specific access class barring for MMTEL video originating calls. |
| ssac-BarringForMMTEL-Voice |
| Service specific access class barring for MMTEL voice originating calls. |
| ul-Bandwidth |
| Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq |
| For FDD: If absent, the (default) value determined from the default TX-RX frequency separation defined in TS 36.101 [42, table 5.7.3-1] applies. |
| For TDD: This parameter is absent and it is equal to the downlink frequency. |

| Conditional presence | Explanation |
|---|---|
| ul-FreqMax | The field is mandatory present if ul-CarrierFreq (i.e. without suffix) is present and set to maxEARFCN. Otherwise the field is not present. |

The terminal device 706 could compute from the broadcasted expiration time a time-to-live value for each instance of the stored WLAN identifiers. The variable would then be modified by adding this time-to-live field in the following manner. The time-to-live field value is computed when the terminal device 706 leaves the cell and it indicates the absolute time when the WLAN identifier information becomes outdated. In that way, the terminal device 706 can remove outdated instances from the list.

The terminal device 706 variable VarWlanIdentifierInfoList includes information about the stored WLAN identifiers per cell.

| VarWlanIdentifierInfoList UE variable |
|---|
| -- ASN1START |
| VarWlanIdentifierInfoList ::=       SEQUENCE (SIZE (1..10)) OF VarWlanIdentifierInfo |

-continued

| VarWlanIdentifierInfoList UE variable | |
|---|---|
| VarWlanIdentifierInfo ::= | SEQUENCE { |
| cellIdentity | CellIdentity, |
| timeToLive | AbsoluteTimeInfo-r10, |
| VarWlanIdentifierList | SEQUENCE (SIZE (1..3) OF |
| VarWlanIdentifier | |
| } | |
| VarWlanIdentifier ::= | OCTET STRING |
| -- ASN1STOP | |

Figure 14:
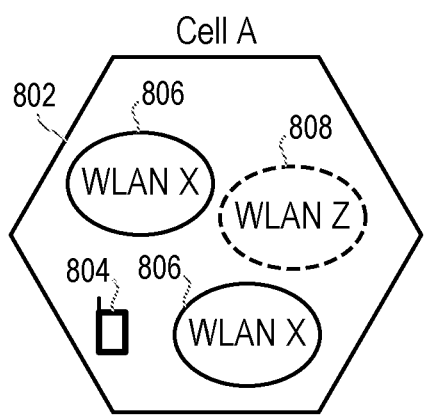
FIG. 14 is a diagram illustrating the removal of a WLAN identifier from a list of WLAN identifiers.

Modification of WLAN identifiers—In some cases a WLAN identifier may become outdated even though the terminal device has not changed cell. For example, if one or more of the WLAN identifiers which are signalled for a particular cell should no longer be considered by the terminal device, then the list of WLAN identifiers the terminal device is maintaining is no longer up-to-date. One example of this is illustrated in FIG. 14. FIG. 14 shows a cell, Cell A 802, with a terminal device 804 and WLANs 806 (WLAN X), and WLAN 808 (WLAN Z). Initially both WLANs X and Z should be considered by the terminal device 804 in Cell A 802, but subsequently WLAN Z 808 should no longer be considered. Hence the WLAN identifiers stored in the terminal device 804 need to be updated. Likewise, a WLAN Z (or another WLAN) could be added to the list of WLANs which should be considered in Cell A 802, which would also render the list of WLAN identifiers maintained by the terminal device 804 outdated.

In some embodiments the network could, when a modification of the considered WLANs is needed, change the value of the systemInfoValueTag which would then indicate to the terminal device 804 that the WLAN identifiers are outdated and the terminal device 804 needs to read the broadcast channel to get updated WLAN identifiers. It should be noted that the network may change the value of the systemInfoValueTag for other reasons than a change of the considered WLAN identifiers.

From the point that the terminal device 804 identifies that updated WLAN identifier information needs to be received (e.g. from a modification of the systemInfoValueTag), the terminal device 804 may continue to consider the previous WLAN identifiers valid until that updated information has been received. For example, if the terminal device 804 moves from one cell to another (e.g. due to cell re-selection or due to handover from one cell to another cell) the terminal device 804 could consider WLAN identifiers which it currently has as valid until the terminal device 804 receives updated WLAN identifiers. This has the benefit that if the terminal device 804 is connected to a WLAN while changing cell the terminal device 804 could stay connected to the current WLAN even though it may not know whether the WLAN it is connected to is valid in the new cell.

Thus, there are provided improved techniques for providing a list of WLAN identifiers to a terminal device for use in an access network selection and/or traffic steering or routing procedure. The techniques provide that WLAN identifiers can be signalled in a broadcast channel while keeping the broadcast channel overhead at a reasonable level. Similar techniques can also be used to transmit other types of information to terminal devices in a broadcast channel.

Mechanisms were also presented that allow terminal devices to refrain from unnecessary reading of the broadcast channel which will save power.

The techniques also provide ways for the terminal device to determine whether it has up-to-date WLAN identifiers during, e.g., mobility, and to update the WLAN identifiers which should be considered in a cell.

It will be appreciated by the person of skill in the art that various modifications may be made to the above described embodiments without departing from the scope of the teaching of the present application. For example, it will be readily appreciated that although the above embodiments are described with reference to parts of a 3GPP network, embodiments will also be applicable to like networks, such as a successor of any current 3GPP network, having like functional components. Therefore, in particular, the terms 3GPP and associated or related terms used in the above description and in the enclosed drawings now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the present techniques can be implemented in other ways than those specifically set forth herein, without departing from essential characteristics of the teaching of this application. The present embodiments are thus to be considered in all respects as illustrative and not restrictive.

Embodiments

1. A method of operating a network node in a cellular communications network, the method comprising:
    Obtaining (101) a list of wireless local area network, WLAN, identifiers that are to be considered by terminal devices in the cellular communications network when the terminal devices perform a access network selection and/or traffic steering or routing procedure with respect to the cellular communications network and one or more WLANs; and
    Dividing (103) the list into a plurality of segments that are to be separately broadcast to the terminal devices in a broadcast channel.

2. The method of embodiment 1, wherein each segment is sized so as to be signalled in a block of the broadcast channel reserved for broadcast of WLAN identifiers.

3. The method of embodiment 1 or 2, wherein the step of dividing the list into a plurality of segments comprises:
    dividing the list such that each segment contains one WLAN identifier.

4. The method of embodiment 3, wherein each segment is broadcast with an indication of the length of the WLAN identifier in the segment.

5. The method of embodiment 3, wherein each segment is broadcast with a marker placed at the end of the WLAN identifier in the segment to indicate the end of the WLAN identifier.

6. The method of embodiment 3, wherein each segment has a length such that the number of octets in the segment agrees with the length of the WLAN identifier.

7. The method of embodiment 1 or 2, wherein the step of dividing (103) the list into a plurality of segments comprises:
    Dividing the list such that each segment contains one or more complete WLAN identifiers.

8. The method of embodiment 7, wherein each segment is broadcast with an indication of the number and/or lengths of the WLAN identifiers in the segment.

9. The method of embodiment 7, wherein each segment is broadcast with one or more markers placed at the end of the or each WLAN identifier in the segment to indicate the end of the WLAN identifier.

10. The method of embodiment 1 or 2, wherein the step of dividing (103) the list into a plurality of segments comprises:
dividing the list such that each segment contains one or more complete or incomplete WLAN identifiers.

11. The method of embodiment 10, wherein each segment is broadcast with an indication of whether the one or more WLAN identifiers in the segment are complete.

12. The method of any preceding embodiment, wherein the first segment or the last segment is broadcast with a marker to identify the start or end of a WLAN identifier provisioning cycle.

13. The method of any preceding embodiment, wherein each segment has an associated tag value that indicates that the information in the broadcast channel has not changed from a previous broadcast.

14. The method of embodiment 13, wherein each segment has an associated tag value that indicates that the information in the broadcast channel has not changed from a previous broadcast, except when the content of the list of WLAN identifiers has changed.

15. The method of any preceding embodiment, the method further comprising the step of:
providing the plurality of segments to another network node for broadcast to the terminal devices.

16. The method of any of embodiments 1 to 14, the method further comprising the step of:
Broadcasting (105) the plurality of segments separately or sequentially to the terminal devices.

17. The method of any preceding embodiment, the method further comprising the step of:
broadcasting an expiration time for the list of WLAN identifiers.

18. A network node for use in a cellular communications network, the network node comprising:
processing circuitry configured to:
obtain a list of wireless local area network, WLAN, identifiers that are to be considered by terminal devices in the cellular communications network when the terminal devices perform an access network selection and/or traffic steering or routing procedure with respect to the cellular communications network and one or more WLANs; and
divide the list into a plurality of segments that are to be separately broadcast to the terminal devices in a broadcast channel.

19. The network node of embodiment 18, the network node further comprising:
interface circuitry configured to provide the plurality of segments to another network node for broadcast to the terminal devices.

20. The network node of embodiment 18, the network node further comprising:
interface circuitry configured to broadcast the plurality of segments separately to the terminal devices.

Further embodiments of the network node are also contemplated in which the processing circuitry is configured to perform the method according to any of embodiments 2 to 14 or 17 described above.

21. A method of operating a terminal device in a cellular communications network, the method comprising:
receiving, over a broadcast channel from the cellular communications network, a plurality of segments of a list of wireless local area network, WLAN, identifiers that are to be considered by the terminal device when the terminal device performs a access network selection and/or traffic steering or routing procedure with respect to the cellular communications network and one or more WLANs; and
combining the received segments to obtain the list of WLAN identifiers.

22. The method of embodiment 21, wherein each received segment contains one WLAN identifier.

23. The method of embodiment 22, wherein each received segment contains an indication of the length of the WLAN identifier in the segment.

24. The method of embodiment 22, wherein each received segment contains a marker placed at the end of the WLAN identifier in the segment to indicate the end of the WLAN identifier.

25. The method of embodiment 22, wherein each received segment has a length such that the number of octets in the segment agrees with the length of the WLAN identifier.

26. The method of embodiment 21, wherein each received segment contains one or more complete WLAN identifiers.

27. The method of embodiment 26, wherein each received segment contains an indication of the number and/or lengths of the WLAN identifiers in the segment.

28. The method of embodiment 26, wherein each received segment contains one or more markers placed at the end of the or each WLAN identifier in the segment to indicate the end of the WLAN identifier.

29. The method of embodiment 21, wherein each received segment contains one or more complete or incomplete WLAN identifiers.

30. The method of embodiment 29, wherein each received segment contains an indication of whether the one or more WLAN identifiers in the segment are complete.

31. The method of any of embodiments 21 to 30, further comprising the step of:
receiving a marker associated with at least one of the first segment and the last segment that identifies the start and/or end of a WLAN identifier provisioning cycle.

32. The method of any of embodiments 21 to 31, further comprising the step of:
repeating the steps of receiving and combining to obtain a new list of WLAN identifiers in the event that there is a change in the serving cell of the terminal device.

33. The method of embodiment 32, further comprising the step of:
continuing to use the obtained list of WLAN identifiers until the new list of WLAN identifiers has been obtained.

34. The method of embodiment 32, further comprising the steps of:
considering the obtained list of WLAN identifiers to be outdated following a change in the serving cell of the terminal device; and
refraining from connecting to WLANs having WLAN identifiers in the outdated list of WLAN identifiers.

35. The method of embodiment 32, further comprising the steps of:
considering the obtained list of WLAN identifiers to be outdated following a change in the serving cell of the terminal device; and
in the event that the terminal device is connected to a WLAN having a WLAN identifier in the outdated list of WLAN identifiers when the change in serving cell occurs, disconnecting from the WLAN.

36. The method of embodiment 32, further comprising the steps of:
- considering the obtained list of WLAN identifiers to be outdated following a change in the serving cell of the terminal device; and
- in the event that the terminal device is connected to a WLAN having a WLAN identifier in the outdated list of WLAN identifiers when the change in serving cell occurs, maintaining the connection to the WLAN.

37. The method of any of embodiments 34, 35 or 36, further comprising the step of:
- discarding the outdated list of WLAN identifiers.

38. The method of any of embodiments 34, 35 or 36, further comprising the step of:
- storing the outdated list of WLAN identifiers and an indication of the cell to which the list of WLAN identifiers applies; and
- using the outdated list of WLAN identifiers in a access network selection and/or traffic steering or routing procedure in the event that the terminal device is again served by the cell to which the list of WLAN identifiers applies.

39. The method of any of embodiments 34, 35, 36 or 38, the method further comprising the step of:
- receiving an expiration time for each list of WLAN identifiers; and
- discarding the outdated list of WLAN identifiers after a time period equal to the expiration time following a change in the serving cell of the terminal device.

40. The method of any of embodiments 21 to 39, the method further comprising the step of:
- using the list of WLAN identifiers in a access network selection and/or traffic steering or routing procedure.

41. A terminal device for use in a cellular communication network, the terminal device comprising:
- a transceiver unit configured to receive, over a broadcast channel from the cellular communications network, a plurality of segments of a list of wireless local area network, WLAN, identifiers that are to be considered by the terminal device when the terminal device performs a access network selection and/or traffic steering or routing procedure with respect to the cellular communications network and one or more WLANs; and
- a processing unit configured to combine the received segments to obtain the list of WLAN identifiers.

42. The terminal device of embodiment 41, wherein the transceiver unit is further configured to communicate with a wireless local area network, WLAN, such as a Wi-Fi network.

Further embodiments of the terminal device are contemplated corresponding to method embodiments 22-40 above.

43. A computer program product having computer readable code embodied therein, the computer readable code being configured such that, on execution by a suitable computer or processing unit, the computer or processing unit is caused to perform the method of any of embodiments 1-17 or 21-40.

The invention claimed is:

1. A method of operating a network node in a cellular communications network, the method comprising:
- obtaining a list of wireless local area network (WLAN) identifiers that are to be considered by terminal devices served by the network node in the cellular communications network to perform an access network selection, or traffic steering, or a routing procedure with respect to the cellular communications network and one or more WLANs; and
- dividing the list into a plurality of segments that are to be separately broadcast to the terminal devices in a broadcast channel; wherein the step of dividing the list into a plurality of segments comprises dividing the list such that each segment contains one WLAN identifier, wherein each segment is broadcast with an indication of the length of the WLAN identifier in the segment.

2. The method of claim 1, wherein each segment is sized so as to be signalled in a block of the broadcast channel reserved for broadcast of WLAN identifiers.

3. The method of claim 1, wherein each segment is broadcast with a marker placed at the end of the WLAN identifier in the segment to indicate the end of the WLAN identifier.

4. The method of claim 1, wherein each segment has a length such that the number of octets in the segment agrees with the length of the WLAN identifier.

5. The method of claim 1, wherein the step of dividing the list into a plurality of segments comprises:
- dividing the list such that each segment contains one or more complete WLAN identifiers.

6. The method of claim 5, wherein each segment is broadcast with an indication of a number of the WLAN identifiers in the segment or a length of the WLAN identifiers in the segment.

7. The method of claim 5, wherein each segment is broadcast with a marker placed after each WLAN identifier in the segment to indicate the end of the WLAN identifier.

8. A network node for use in a cellular communications network, the network node comprising:
- processing circuitry configured to:
  - obtain a list of wireless local area network (WLAN) identifiers that are to be considered by terminal devices served by the network node in the cellular communications network to perform an access network selection, or traffic steering, or a routing procedure with respect to the cellular communications network and one or more WLANs; and
  - divide the list into a plurality of segments that are to be separately broadcast to the terminal devices in a broadcast channel,
  - wherein each segment contains one WLAN identifier, and wherein each segment is broadcast with an indication of the length of the WLAN identifier in the segment.

9. The network node of claim 8, the network node further comprising: interface circuitry configured to provide the plurality of segments to another network node for broadcast to the terminal devices.

10. A method of operating a terminal device in a cellular communications network, the method comprising:
- receiving, over a broadcast channel from a network node of the cellular communications network, a plurality of segments of a list of wireless local area network (WLAN) identifiers that are to be considered by the terminal device to perform an access network selection, or traffic steering, or a routing procedure with respect to the cellular communications network and one or more WLANs; and
- combining the received segments to obtain the list of WLAN identifiers; wherein each received segment contains one WLAN identifier,
- wherein each received segment contains an indication of the length of the WLAN identifier in the segment.

11. The method of claim 10, wherein each received segment contains a marker placed at the end of the WLAN identifier in the segment to indicate the end of the WLAN identifier.

12. A terminal device for use in a cellular communication network, the terminal device comprising:
- a transceiver configured to receive, over a broadcast channel from a network node of the cellular communications network, a plurality of segments of a list of wireless local area network (WLAN) identifiers that are to be considered by the terminal device when the terminal device to perform an access network selection, or traffic steering, or a routing procedure with respect to the cellular communications network and one or more WLANs; and
- a processor configured to combine the received segments to obtain the list of WLAN identifiers,
- wherein each received segment contains one WLAN identifier, and
- wherein each received segment contains an indication of the length of the WLAN identifier in the segment.

13. The terminal device of claim 12, wherein the transceiver is further configured to communicate with the WLAN.

* * * * *